Figure 1:
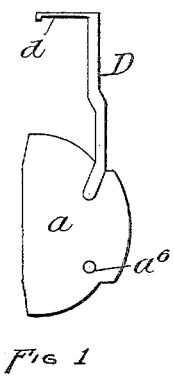

No. 640,311. Patented Jan. 2, 1900.
J. B. NEWTON.
DEVICE FOR REPLACING DERAILED CARS OR LOCOMOTIVES.
(Application filed June 7, 1899.)

(No Model.) 2 Sheets—Sheet 1.

WITNESSES.
Christ Grannoman
F. D. Dorwin

James B. Newton INVENTOR.

THE NORRIS PETERS CO., PHOTO-LITHO., WASHINGTON, D. C.

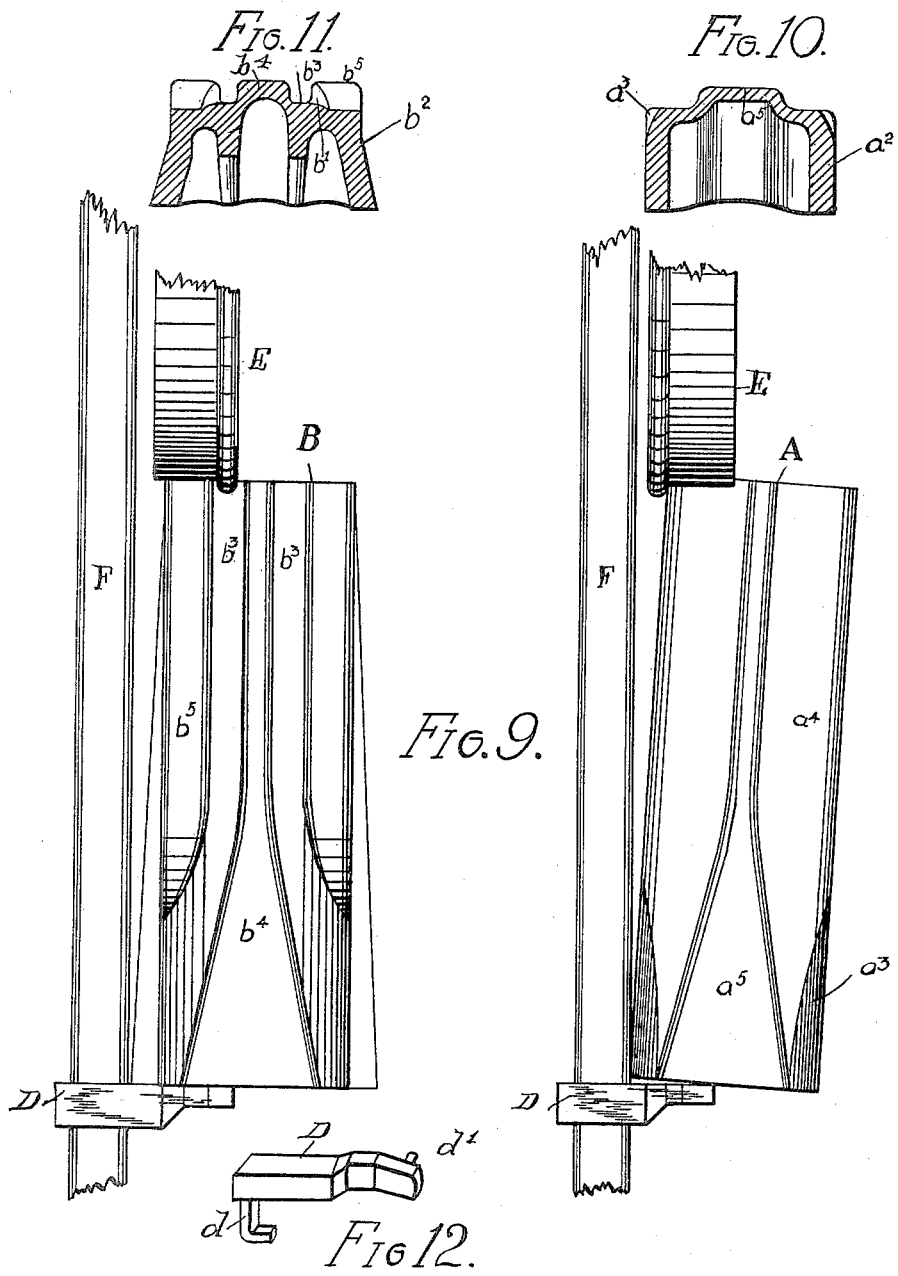

UNITED STATES PATENT OFFICE.

JAMES B. NEWTON, OF SPRINGFIELD, ILLINOIS.

DEVICE FOR REPLACING DERAILED CARS OR LOCOMOTIVES.

SPECIFICATION forming part of Letters Patent No. 640,311, dated January 2, 1900.

Application filed June 7, 1899. Serial No. 719,736. (No model.)

*To all whom it may concern:*

Be it known that I, JAMES B. NEWTON, a citizen of the United States, residing at Springfield, in the county of Sangamon and State of Illinois, have invented certain new and useful Improvements in Devices for Replacing Derailed Locomotives or Cars, of which the following is such a full, clear, and exact description as will enable others skilled in the art to which it appertains to make and use my invention.

My invention relates to railway locomotive and car replacers of that class which employ inclines upon which the locomotive or car travels to raise it to such height that it may be slid transversely to the rails in such manner as to replace the wheels on the rails of a railway.

The purposes of my invention are to provide a pair of incline blocks having tread-surfaces as wide as the tread-surfaces of the wheels running thereon, to the end that the traction of the wheels may be most effectively utilized in ascending the inclines, to provide simple and effective means whereby the wheels ascending the inclines may be slid transversely to the track after being raised sufficiently to permit the flanges of the wheels to pass over the rails, to provide an inside incline block so constructed and arranged that the side of the incline will be parallel to the head of the rail and one side of the base of the incline will underlie the head and rest on the base of the rail in such position that there will be room between the upper edge of the block and the head of the rail for the flange of the wheel to run between them, to provide incline blocks of improved form specially adapted for use with blind or flangeless wheels, to provide incline-blocks so formed that maximum strength and rigidity is attained with minimum material, and to provide simple and effective means for connecting the incline blocks with the rails, so as to prevent lateral displacement of the blocks.

With these ends in view my invention consists in the novel features of construction and combinations of parts shown in the drawings hereto annexed and hereinafter particularly described, and pointed out in the claims.

Briefly stated, the elements of my invention are an outside incline block and inside incline block and means for connecting said blocks with the rails of a railway.

Figure 2:
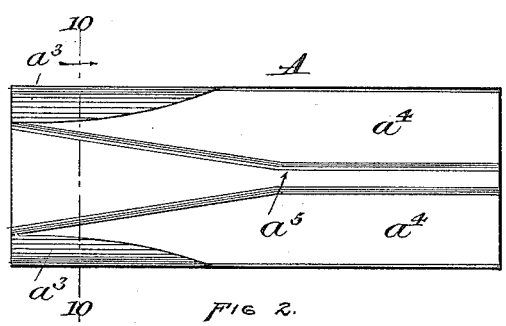
Figure 3:
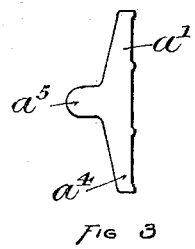
Figure 4:
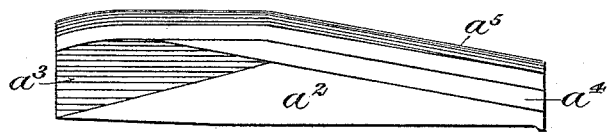
Figure 5:
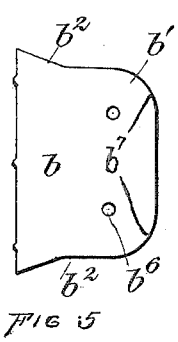
Figure 6:
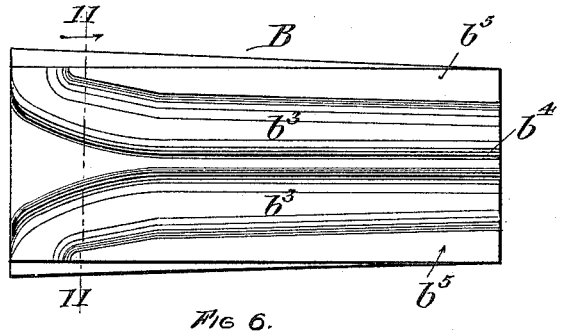
Figure 7:
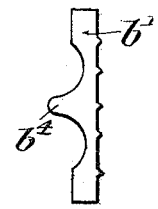
Figure 8:
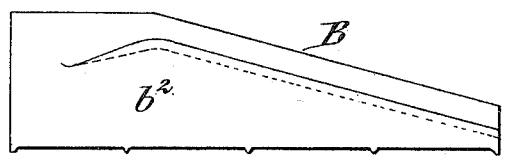

Referring to the drawings, Figure 1 is an elevation of the rear end of the outside incline block, one of the securing devices being shown in position thereon. Figs. 2, 3, and 4 are respectively a top plan, a front elevation, and a side elevation of the outside incline block. Figs. 5, 6, 7, and 8 are respectively a rear elevation, a top plan, a front elevation, and a side elevation of the inside incline block. Fig. 9 is an enlarged top plan of the replacing device connected with the rails of a railway in position for use. Fig. 10 is an enlarged transverse section through the outside incline block on the line 10 10 of Fig. 2. Fig. 11 is an enlarged transverse section on the line 11 11 of Fig. 6, and Fig. 12 is an enlarged perspective view of one of the securing devices.

Similar letters of reference designate like parts in all of the views.

The outside incline block A has vertical end walls $a$ and $a'$ and side walls which are in part vertical, as at $a^2$, and in part convex, as at $a^3$. The upper surfaces $a^4$ of the block slope slightly outward from a central rib $a^5$ and incline upward from the front toward the rear of the block. The convex part $a^3$ of the wall merges into the parts $a^2$ and $a^4$, as shown. The rib $a^5$ is straight and of even thickness from the front end of the incline block to a point about midway of the block, whence it widens until it terminates at the rear end of the block, as shown in Fig. 2. The wide end of the rib curves slightly outward, and the base of the rib merges into the convex surface.

The block A is of approximately arch-shaped cross-section, as shown in Fig. 10. This form of block combines lightness and rigidity to a degree which is of great practical advantage in appliances of this class. In the rear wall of the block are holes $a^6$, in which the pin $d$ of the securing device fits. One hole $a^6$ is contiguous to each side of the block. Both sides of the block are of the same form, and there are two holes in the block in order that the block may be used either on the right-hand side or on the left-hand side of a rail, as occasion may require. When the block is used on the right-hand side of the rail, the pin $d'$ on the bar D is placed in the right-hand hole $a^6$, and when the block is used on the left-hand side of a rail the pin $d'$ is placed in the left-hand hole $a^6$.

The inside incline block B has vertical end walls $b$ and $b'$. The side walls $b^2$ are approximately concave, and the lower edge of each side wall extends laterally somewhat beyond its upper edge. The side walls of the block are made substantially concave, as described, in order that when the block is in place for use the upper part of the block may lie alongside the head of the rail, but removed sufficiently therefrom for the flange of a car-wheel to run between the block and the head of the rail, and the lower edge of the block lies on top of the base of the rail, and the flange of the rail forms a substantial support for one side of the block, the other end of the block being supported on the projecting ends of the ties on which the rails are laid.

The block B is in cross-section approximately in the form of a triple arch, which structure gives the block maximum rigidity with minimum material. The block B is traversed longitudinally by flangeways $b^3$, in which the flanges of wheels traveling on the block run. The flangeways $b^3$ are separated by a rib $b^4$, which is straight and of even thickness for about two-thirds of its length from the front. Thence it widens, as shown, until it terminates at the rear end of the block. The basal part of the wide end of the rib $b^4$ and the bottom surfaces of the flangeways $b^3$ curve convexly, as at $b^7$, and merge into the side walls $b^2$. The traction-surfaces $b^5$, on which the treads of the wheels run when the blocks are in use, incline upward from the front to the rear end of the block and lie above the bottoms of the flangeways $b^3$ sufficiently for the flange of the wheel to travel in the flangeway when the tread of the wheel is running on the traction-surface.

The upper extremities of the surfaces $b^5$ curve convexly downward and merge into the convex surfaces of the flangeways $b^3$. The rib $b^4$ projects above the surfaces $b^5$ and serves to guide the wheel and prevent lateral displacement thereof. To connect the incline blocks with the rails of a railway, I employ a connecting-bar D, having at one extremity a hook $d$, which hooks under and around the head of the rail, and having at its other extremity a pin $d'$, fitting in the holes $a^6$ and $b^6$ in the blocks A and B, respectively.

The method of using my replacing device will be understood by reference to Fig. 9, in which is shown in outline a part of a railway-track F, two derailed wheels E, and the inclined blocks connecting with the rails in position for replacement of the derailed wheels. The inside block B is placed with its front end in such position that the flange of the wheel will lie in the flangeway $b^3$ and the tread of the wheel will lie on the traction-surface $b^5$. The rear end of the block lies inward from the rail a distance sufficient to permit the flange of the wheel to come between the head of the rail and the side of the block. The outside block A is placed with its front end in such position that the tread of the wheel will lie on the surface $a^4$ and the flange of the wheel will lie between the side of the block and the head of the rail. At the rear end of the block the side lies close against the head of the rail.

In the operation of replacing the derailed wheels the tread of the inside wheel travels upward on the inclined surface $b^5$ and its flange travels upward in the flangeways $b^3$. The tread of the outside wheel travels upward on the inclined surface $a^4$, and its flange travels between the block and the head of the rail until the wheel has been raised sufficiently to permit the flange to pass over the rail. At this stage of the operation the sides of the wheels engage with the expanded parts of the ribs $a^5$ and $b^4$, and the expanding sides of the ribs cause the wheels to slide laterally until they reach a position in which the treads of the wheels project a little over the heads of the rails. As the wheels continue to move upward on the blocks the curved sides of the widened part of the ribs $a^5$ and $b^4$ cause the wheels to slide still farther laterally until the wheels coming onto the convex surfaces $a^3$ and $b^7$ slide down the convex surfaces of the block and are deposited in the proper position on the rails.

By employing the traction-surfaces $a^4$ and $b^5$, on which the tread of the wheel bears for the full width of the tread, the traction of the wheel is utilized most effectively in replacing the derailed wheels, and I have found in practice that by using wide traction-surfaces a derailed locomotive under steam may be made to replace itself. This cannot be done with those replacing devices which are so constructed that in using them the wheel must run up the inclines on its flange alone and without utilizing the larger surface of the tread of the wheel.

The ribs $a^4$ and $b^5$, projecting above the traction-surfaces and spreading outward at their upper ends, specially adapt my device to the replacing of the flangeless or blind wheels, since the ribs prevent lateral displacement of the wheel and also guide it in the way in which it should go. By reason of the form of my incline blocks I am enabled to dispense with movable switches or like devices for controlling the movements of the wheels on the inclines.

Having fully described my invention, what I claim as new, and desire to secure by Letters Patent, is—

1. An inside incline for locomotive and car replacers, consisting of a block broadened at its base and having upwardly-inclined flangeways, separated by a rib broadening for about one-third of the length of the block and curving convexly downward at its upper extremity and merging into the side walls of the block, and traction-surfaces contiguous to said flangeways and at their upper ends curving convexly downward and merging into said flangeways.

2. An outside incline block for locomotive and car replacers consisting of a block having continuous side walls also having traction-surfaces inclining laterally and upwardly and curving convexly downward near their upper extremities and merging into the side walls of said block, also having a rib separating said traction-surfaces and broadening upwardly from about the middle of the block and curving convexly downward near its upper extremity and merging into the convex part of said traction-surfaces, as set forth.

3. In a locomotive and car replacer the combination an inside incline block substantially of the form described and having at its upper end holes, an outside incline block having traction-surfaces, flangeways and an expanding-rib separating said flangeways, also having holes in one end thereof and connecting devices having hooks adapted to hook under and around the head of a rail and having pins fitting in the holes in said inside incline block and outside incline block respectively, as set forth.

In witness whereof I have hereunto subscribed my name, at Springfield, Illinois, this 26th day of August, 1899.

JAMES B. NEWTON.

Witnesses:
PASCAL E. HATCH,
N. DU BOIS.